(12) United States Patent
Akamatsu et al.

(10) Patent No.: US 11,449,135 B2
(45) Date of Patent: Sep. 20, 2022

(54) TERMINAL APPARATUS AND METHOD FOR CONTROLLING TERMINAL APPARATUS

(71) Applicant: NTT DOCOMO, INC., Chiyoda-ku (JP)

(72) Inventors: Shigeru Akamatsu, Chiyoda-ku (JP); Koichi Asano, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/265,654

(22) PCT Filed: Jun. 10, 2019

(86) PCT No.: PCT/JP2019/022902
§ 371 (c)(1),
(2) Date: Feb. 3, 2021

(87) PCT Pub. No.: WO2020/031493
PCT Pub. Date: Feb. 13, 2020

(65) Prior Publication Data
US 2021/0303061 A1    Sep. 30, 2021

(30) Foreign Application Priority Data
Aug. 8, 2018 (JP) .............................. JP2018-149267

(51) Int. Cl.
*G09G 5/00* (2006.01)
*G06F 3/01* (2006.01)

(52) U.S. Cl.
CPC .................................. *G06F 3/011* (2013.01)

(58) Field of Classification Search
CPC ......... G06F 3/011; G06F 3/017; G06F 3/0484
See application file for complete search history.

(56) References Cited

U.S. PATENT DOCUMENTS

| | | | |
|---|---|---|---|
| 8,659,658 B2* | 2/2014 | Vassigh | G06T 7/251 348/143 |
| 2010/0315413 A1* | 12/2010 | Izadi | G06F 3/0421 345/419 |

(Continued)

FOREIGN PATENT DOCUMENTS

JP    2018-32383 A    3/2018

OTHER PUBLICATIONS

International Search Report dated Aug. 6, 2019 in PCT/JP2019/022902 filed on Jun. 10, 2019, 1 page.

*Primary Examiner* — Adam R. Giesy
(74) *Attorney, Agent, or Firm* — Oblon, McClelland, Maier & Neustadt, L.L.P.

(57) ABSTRACT

A terminal apparatus includes: an image capture device that captures an image of a direction that a user faces; a display controller configured to synthesize an image of a pointer captured by the image capture device with an image of a virtual or real space, to display the synthesized image on a display device; a first determiner that determines whether the pointer in the space displayed on the display device at a first time point satisfies an initial condition; an operation controller that stores reference size information relating to a size of the pointer in association with a reference distance in a storage device, with the size of the pointer being as in a case in which it is determined that the initial condition is satisfied; and a second determiner that compares a size of the pointer in the space at a second time point after the initial condition is satisfied with the size indicated by the reference size information, to determine whether the pointer is at a position that is closer than a point at the reference distance associated with the reference size information as viewed from the user, or is at a position farther than the point at the reference distance as viewed from the user.

7 Claims, 9 Drawing Sheets

(56) References Cited

U.S. PATENT DOCUMENTS

2018/0350056 A1* 12/2018 Cardenas Bernal .... G06T 7/001
2019/0018479 A1* 1/2019 Minami ................. G06F 3/017

* cited by examiner

| ACTION | COMMAND |
|---|---|
| TOUCH FOR 1 SECOND | TAP |
| TOUCH FOR 3 SECONDS | LONG TAP |
| MOVE AFTER TOUCH | SWIPE |
| ...... | ...... |

FIG. 16

TERMINAL APPARATUS AND METHOD FOR CONTROLLING TERMINAL APPARATUS

TECHNICAL FIELD

The present invention relates to a terminal apparatus and to a method for controlling a terminal apparatus.

BACKGROUND ART

In recent years, technologies are known capable of providing to a user wearing a head-mounted display a virtual or real space in which various objects are synthesized. Such a space is provided as a three-dimensional space by a computer or the like, and technologies such as the following have been proposed to assist an input in three-dimensional spaces. Specifically, in a proposed technology, a user wears a dedicated device, such as a glove having a motion sensor, and the dedicated device detects a hand movement of the user, and if, for example, the detected hand movement makes contact with an object placed in the virtual space, an input operation for the object is accepted (e.g., Patent Document 1).

RELATED ART

Patent Document

Patent Document 1 Japanese Patent Application Laid-Open Publication No. 2018-32383

SUMMARY OF THE INVENTION

Problem to be Solved by the Invention

For simplicity, the head-mounted display may be constituted of a smartphone and goggles, for example. In such a case, however, a configuration in which the user wears a dedicated device, such as a glove, is not only cumbersome for the user, but it also inhibits simplification.

Means of Solving the Problem

To achieve one of the aforementioned purposes, a terminal apparatus according to one aspect of the present invention includes: an image capture device configured to capture an image of a direction that a user faces; a display controller configured to synthesize an image of a pointer captured by the image capture device with an image of a virtual or real space, to display the synthesized image on a display device; a first determiner configured to determine whether the pointer in the space displayed on the display device at a first time point satisfies an initial condition; an operation controller configured to store reference size information relating to a size of the pointer in association with a reference distance in a storage device, with the size of the pointer being as in a case in which it is determined that the initial condition is satisfied; and a second determiner configured to compare a size of the pointer in the space at a second time point after the initial condition is satisfied with the size indicated by the reference size information, to determine whether the pointer is at a position that is closer than a point at the reference distance associated with the reference size information as viewed from the user, or whether it is at a position farther than the point at the reference distance as viewed from the user.

According to the terminal apparatus of the above aspect, the size of the pointer displayed in the virtual or real space is compared with the reference size of the pointer satisfying the initial condition, and it is determined whether the pointer is at a position closer to or farther than a point at a reference distance from the user. As a result, since a smartphone or the like with an image capture device can be used as a terminal apparatus, the need for a dedicated device, such as a glove including a sensor, can be eliminated in assisting an input in a virtual space by using the depth of the pointer as viewed by the user in the virtual space.

MODES FOR CARRYING OUT THE INVENTION

A mode for carrying out the present invention will be described below with reference to the drawings. An embodiment described below is a preferred specific example of the present invention, and various technically preferred limitations are added thereto. However, the scope of the invention is not limited to these forms, unless it is specifically stated in the following description that the invention is so limited.

Embodiment

Figure 1:
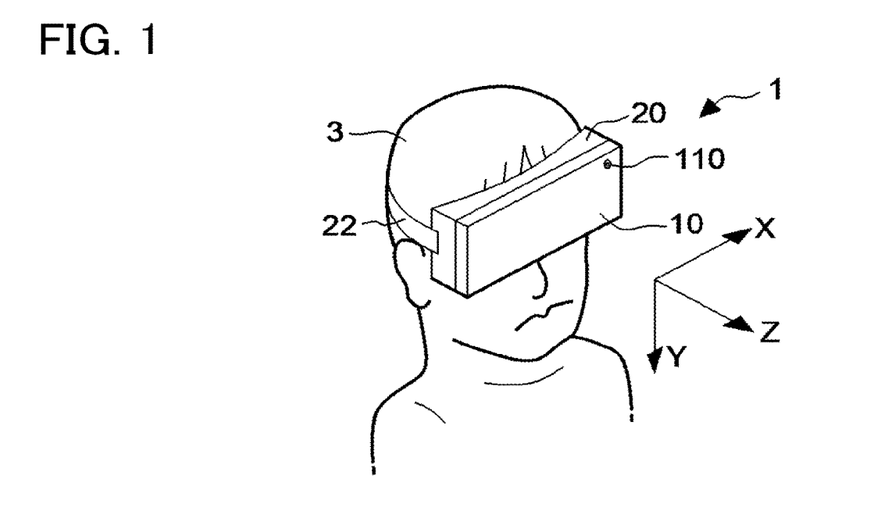
FIG. 1 is a view showing a head-mounted display to which a terminal apparatus according to an embodiment is applied.

FIG. 1 is a diagram for explaining an overview of a head-mounted display (hereafter referred to as HMD) 1. As shown in this figure, the HMD 1 includes a terminal apparatus 10 according to an embodiment and goggles 20 to which the terminal apparatus 10 is mounted. The goggles 20 are attached to the head of a user 3 by a headband 22 at a position where the terminal apparatus 10 is in front of both eyes of the user 3.

The terminal apparatus 10 is, for example, a smartphone, and a surface facing the user 3 is the front surface thereof. A display device is disposed on the front surface, although it is hidden in the figure. A mounting surface of the goggles 20 for mounting the terminal apparatus 10 has, although not particularly illustrated, an opening for making only an image for the left eye visible to the left eye of the user 3 and an opening for making only an image for the right eye visible to the right eye of the user 3. This allows the user 3 to see a virtual space indicated by a displayed image in a three-dimensional manner in a case in which, in order to provide a virtual space, the display device of the terminal apparatus 10 displays an image for the left eye in an area corresponding to the opening of the left eye and an image for the right eye in an area corresponding to the opening of the right eye by imparting parallax thereto.

An image capture device 110 is positioned on the backside of the terminal apparatus 10, i.e., a side at front in FIG. 1. The terminal apparatus 10 is not limited to a smartphone, and it may also be a display device dedicated to HMDs mounted to goggles. The terminal apparatus 10 may also be an HMD device with goggles (i.e., undetachable from the goggles).

Figure 2:
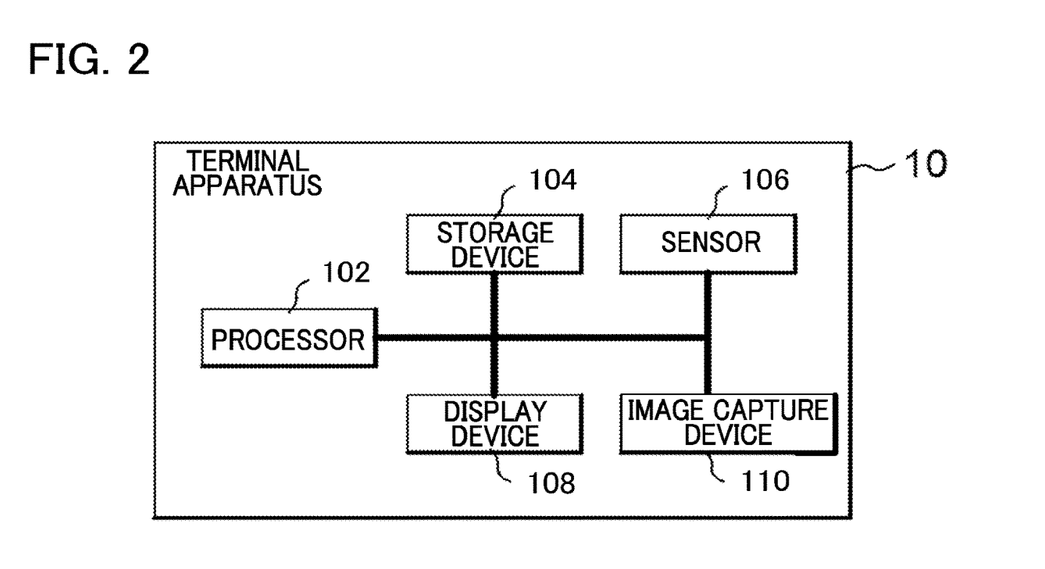
FIG. 2 is a block diagram showing a configuration of the terminal apparatus.

FIG. 2 is a diagram showing a hardware configuration of the terminal apparatus 10. As shown in the figure, the terminal apparatus 10 is realized by a computer system that has a processor 102, a storage device 104, a sensor 106, a display device 108, and the image capture device 110. Each element of the terminal apparatus 10 is connected to each other by a single bus or multiple buses. The term "apparatus" in this description may be replaced with another term such as circuit, device, or unit. Each element of the terminal apparatus 10 comprises a single device or plurality of devices. Some elements of the terminal apparatus 10 may be omitted.

The processor 102 controls the entire terminal apparatus 10 and comprises, for example, a single chip or multiple chips. The processor 102 is constituted of, for example, a central processing unit (CPU) including an interface with peripheral devices, an arithmetic unit and registers, and the like. Some or all of the functions of the processor 102 may be performed by a Digital Signal Processor (DSP), Application Specific Integrated Circuit (ASIC), Programmable Logic Device (PLD), FPGA (FPGA) (Field Programmable Gate Array) or other hardware. The processor 102 executes various processes in parallel or sequentially.

The storage device 104 is a recording medium that can be used by the processor 102 and stores a plurality of programs executed by the processor 102 and various data used by the processor 102. The plurality of programs executed by the processor 102 includes an operating system (OS), and an application program that provides a virtual space to the user 3. The various data include reference size information on a pointer size of the pointer when it is determined that an initial condition is satisfied, and a reference distance associated with the reference size information, as described below. The storage device 104 may, for example, include one or more types of ROM (Read Only Memory), EPROM (Erasable Programmable ROM), EEPROM (Electrically Erasable Programmable ROM), RAM (Random Access Memory) and other types of memory circuits.

The sensor 106 is a three-axis angle sensor, for example, for detecting the orientation and movement of the terminal apparatus 10. The display device 108 displays various images (including still images and moving images) under control by the processor 102. In particular, in this embodiment, the image for the left eye and the image for the right eye showing the aforementioned virtual space are displayed by the display device 108. Various display panels, such as liquid crystal display panels or organic EL display panels, may be suitably used as the display device 108. The image capture device 110 is a rear camera disposed on the backside of the terminal apparatus 10. When the user 3 wears the goggles 20 to which the terminal apparatus 10 is mounted, the image capture device 110 captures an image of the direction in which the face of the user 3 is facing.

Figure 3:
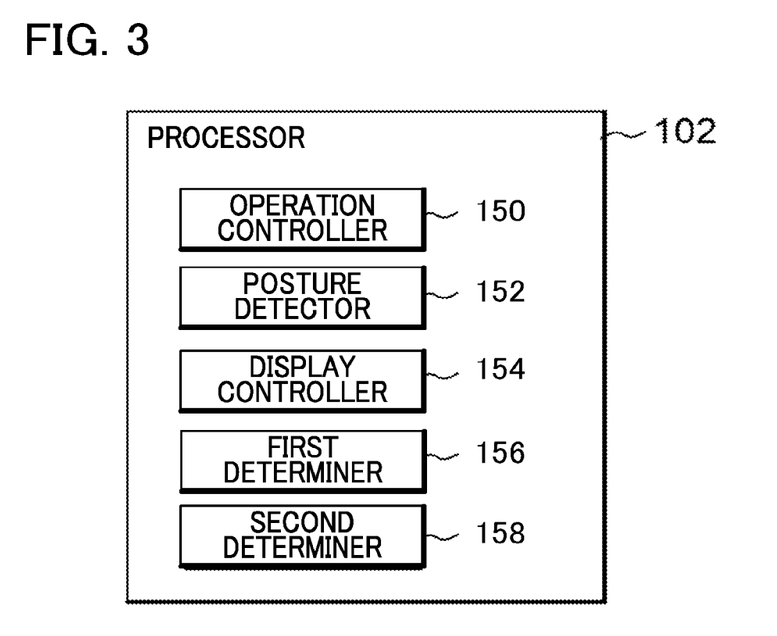
FIG. 3 is a block diagram showing an example configuration of functions realized in the terminal apparatus.

FIG. 3 is a block diagram showing a functional configuration realized by the processor 102 of the terminal apparatus 10 executing the program providing the virtual space. As shown in this figure, an operation controller 150, a posture detector 152, a display controller 154, a first determiner 156, and a second determiner 158 are realized in the terminal apparatus 10.

The posture detector 152 processes detection results output from the sensor 106 and outputs the processed results as posture information of the terminal apparatus 10. Specifically, the posture detector 152 processes the detection results of the sensor 106, i.e., the detection results of each acceleration in the X-axis in the horizontal direction, the Y-axis in the vertical direction, and the Z-axis in the depth direction, as shown in FIG. 1, and outputs the posture information of the terminal apparatus 10 periodically, for example, every 0.03 seconds.

The display controller 154 generates and controls a screen displayed by the display device 108. Specifically, the display controller 154 generates respective images for the left eye and for the right eye for enabling stereoscopic view in the virtual space, and displays the image for the left eye in an area corresponding to the opening of the left eye and the image for the right eye in an area corresponding to the opening of the right eye, respectively, in the display area of the display device 108. The virtual space is a space that simulates the reality generated in the terminal apparatus 10. The virtual space is a concept that extends in all directions around the user 3. In the omnidirectional space, a space corresponding to a direction in which the face of the user 3 is facing, which is detected based on the posture information of the terminal apparatus 10, is partially cut out and displayed on the display device 108.

Figure 4:
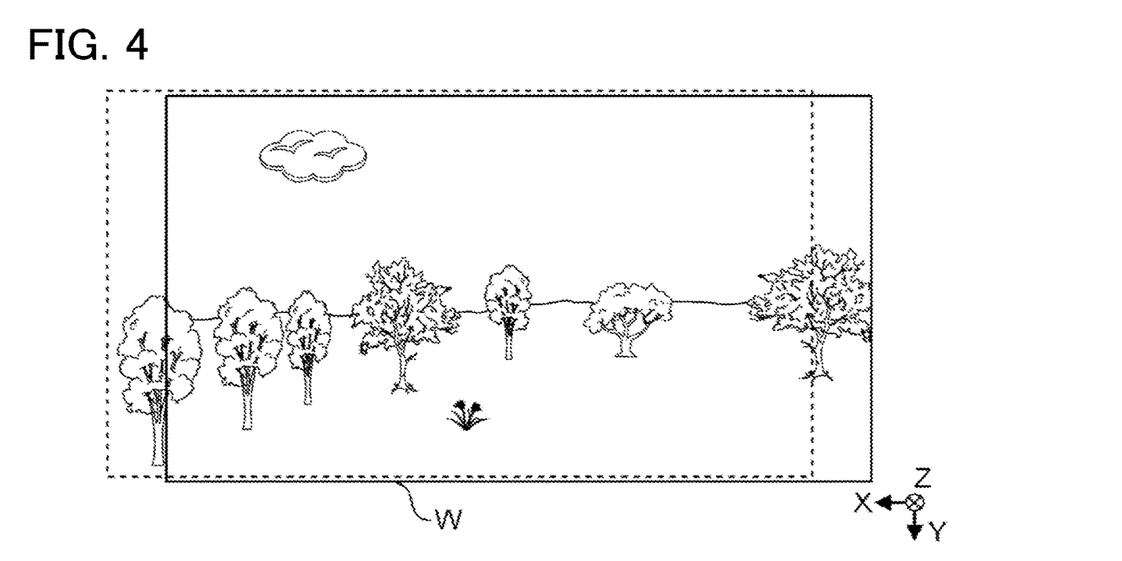
FIG. 4 is a diagram showing an example of a virtual space provided by a display device of the terminal apparatus.

FIG. 4 is a diagram for describing the virtual space provided by the terminal apparatus 10. In this figure, reference sign W is a viewing frame that serves as a cutout frame of the virtual space when the face of the user 3, when wearing goggles 20 to which the terminal apparatus 10 is mounted, is facing in a certain direction. This figure is an example of a natural landscape provided as a virtual space. Since the virtual space is provided to the user 3 in stereoscopic view with images for the left eye and images for the right eye, the viewing frame W does not comprise the screen itself displayed on the display device 108.

A case is assumed in which the face of the user 3 is turned in a certain direction and a virtual space of a natural landscape, as shown in the figure by the solid line viewing frame W in FIG. 4, is provided. If the user 3 rotates the head and turns to face to the left (in the X-axis direction), posture information corresponding to the rotation is output from the posture detector 152.

After acquiring the posture information, the display controller 154 moves the viewing frame W, as indicated by the dashed line in FIG. 4, to move the virtual space provided to the user 3 to the left. Since the virtual space moves in this manner according to the direction in which the face is facing, the user 3 can obtain a sensation, through vision, as if the user were in a space in which a natural landscape exists.

When an image of a real space including a manipulating body of a predetermined shape is captured by the image capture device 110 in a state in which the display controller 154 displays the image of the virtual space on the display device 108, the display controller 154 cuts out the image of the manipulating body from the background image of the real space by image processing, and synthesizes the image of the cut out manipulating body with an image of the virtual space for display. The manipulating body of the predetermined shape is, for example, a hand of the user 3 ranging from the fingertip to the wrist. The manipulating body of the predetermined shape is not limited to the hand, and it may be something that can be photographed by the image capture device 110 and can be moved as desired by the user 3. The manipulating body may be, for example, a pen tip or the like operated by the user 3. The operation controller 150 may control the posture detector 152, the display controller 154, the first determiner 156, and the second determiner 158.

Figure 5:
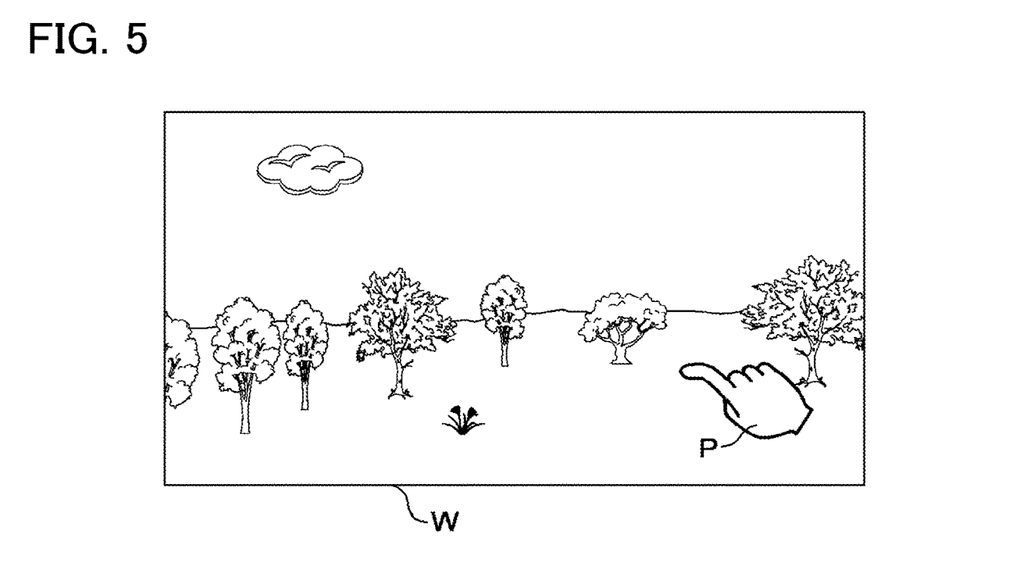
FIG. 5 is a diagram showing an example of a pointer displayed in a virtual space.
Figure 6:
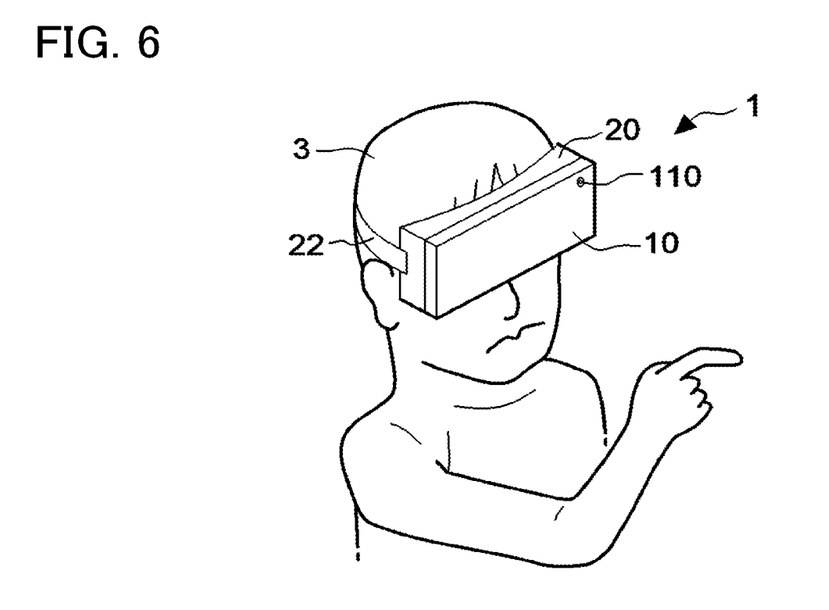
FIG. 6 is a diagram showing an example of manipulation by a user.

FIG. 5 is an example of an image of the right hand of the user 3 displayed in the virtual space provided by the terminal apparatus 10, and FIG. 6 illustrates a movement performed by the user 3 when the above image is displayed.

As shown in FIG. 6, if the user 3 wearing the goggles 20 to which the terminal apparatus 10 is mounted makes a gesture such as to point at something with the index finger of the right hand in the imaging area of the image capture device 110, the image of the right hand cut out from the background image of the imaging area is synthesized with the image of the virtual space and displayed in the virtual space as shown in FIG. 5.

The right hand displayed in this case is a pointer P manipulated by the user 3 in the virtual space, as described below. In FIG. 5, the right hand is shown as the pointer P, but it may also include a forearm and an upper arm. The pointer P, when displayed in the virtual space, may be, by image processing, an image cut out of the background or an image filled in inside the outline of the cut out image.

When the pointer P is displayed in the virtual space at a freely selected time point (a first time point), the first determiner 156 determines whether the pointer P satisfies an initial condition described below, and if it is determined that it satisfies the initial condition, the first determiner 156 stores reference size information relating to the size of the displayed pointer P in association with the reference distance in the storage device 104. The second determiner 158 compares the size of the pointer displayed in the virtual space at a second time point, which is after the initial condition is satisfied, with the size of the pointer at the time the initial condition is satisfied, to determine whether the pointer P is at a position closer to or farther from a point at the reference distance as viewed from the user 3.

Figure 7:
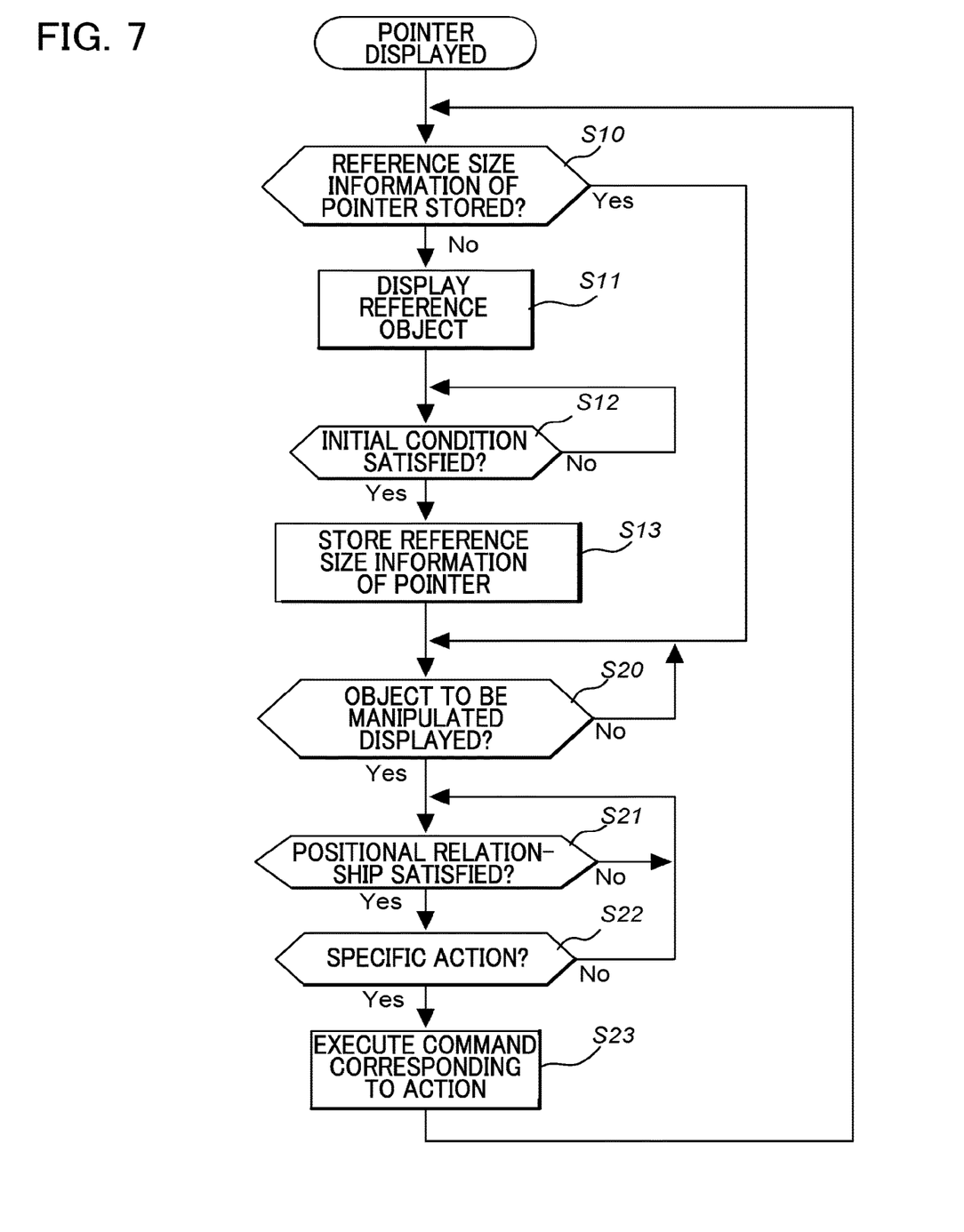
FIG. 7 is a flowchart showing an example operation of the terminal apparatus.

FIG. 7 is a flowchart showing an operation when the pointer P is displayed in the virtual space. This operation is initiated when the pointer P is displayed in the virtual space as a result of the user 3 putting a hand in the imaging area of the image capture device 110. In other words, this operation is not performed unless the user 3 puts a hand in the imaging area of the image capture device 110 and the pointer P is displayed in the virtual space.

First, when the pointer P is displayed, the operation controller 150 determines whether the reference size information regarding the size of the pointer P and the reference distance are stored in association with each other in the storage device 104 (step S10). If the reference size information relating to the size of the pointer P and the reference distance are stored in the storage device 104 in association with each other (if a result of the determination in step S10 is "Yes"), there is no need for the operation controller 150 to execute a determination process of the initial condition in the next steps S11 to S13, so the processing procedure skips to step S20.

On the other hand, if the reference size information relating to the size of the pointer P and the reference distance are not stored in association in the storage device 104 (if the determination result of step S10 is "No"), the display controller 154 controls the display device 108 and causes a reference object to be displayed in the virtual space (step S11). The reference object refers to an icon, software button, or display message that is displayed to obtain the size of the pointer P as a reference for determining the relative position of the pointer P in the depth direction of the pointer P in subsequent processing.

Figure 8:
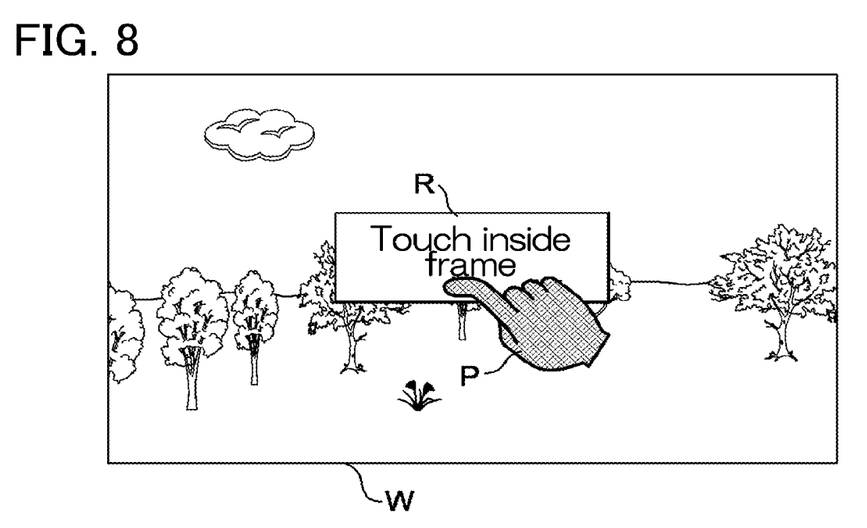
FIG. 8 is a diagram showing an example screen displayed by the display device.

FIG. 8 is a diagram illustrating an example of a reference object displayed in the virtual space. As shown in this figure, a reference object R is displayed in the form of a square frame containing a message approximately at the center within the viewing frame W of the virtual space provided to the user 3. The display controller 154 displays the reference object R at a point at which the reference object R is at a reference distance from the user 3. The reference distance is a value that will be used as a reference in a subsequently performed relative decision, and the value itself does not have any special meaning.

Figure 9:
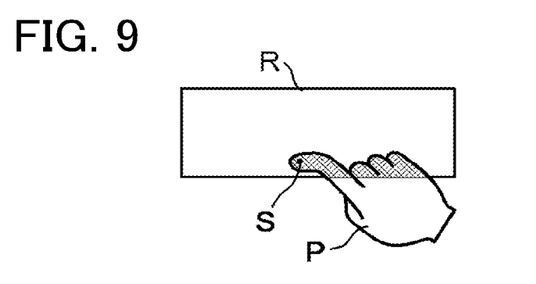
FIG. 9 is a diagram showing an example of determination of an initial condition.

The first determiner 156 determines whether the reference object R and the pointer P have satisfied the initial condition (step S12). The first determiner 156 determines that the initial condition is satisfied when, for example, the pointer P is such that it can be regarded as having pointed to the reference object R. Specifically, in the present embodiment, the first determiner 156 determines that the initial condition is satisfied in a state such as shown in FIG. 9, i.e., when the tip S of the index finger of the pointer P is located within the square frame of the reference object R. That is, the initial condition is satisfied when the user 3, using a finger, points to the reference object R displayed at a point at the reference distance from the user at a position in the depth direction that is easy to operate regardless of the reference distance. The initial condition may further require that this state be continued for a certain amount of time (e.g., 2 seconds).

If it is determined that the initial condition is not satisfied (if a result of the determination of step S12 is "No"), the first determiner 156 again executes the determination of step S12. If the reference size information relating to the size of the pointer P and the reference distance are not stored in association with each other in the storage device 104 when the pointer P is displayed in the virtual space, the first determiner 156 repeats step S12 until it is determined that the initial condition is satisfied.

If it is determined that the initial condition is satisfied (if the result of the decision in step S12 is "Yes"), then the operation controller 150 obtains from the display controller 154 reference size information relating to the size of the pointer P as of the time the initial condition is satisfied and stores the information in the storage device 104 in association with the reference distance (step S13). The reference size information may be the area of the pointer P displayed in the virtual space (number of pixels comprising the pointer P). The reference size information relating to the size of the pointer P as of the time the initial condition is satisfied may be other than the area, and may be the size in the X direction or the size in the Y direction.

Next, the operation controller 150 determines whether an object to be manipulated is displayed in the virtual space (step S20). The object to be manipulated is an icon, software button or the like that is manipulated by the pointer P in a virtual space. The object to be manipulated is displayed at a point at a reference distance as viewed from the user 3.

Figure 10:
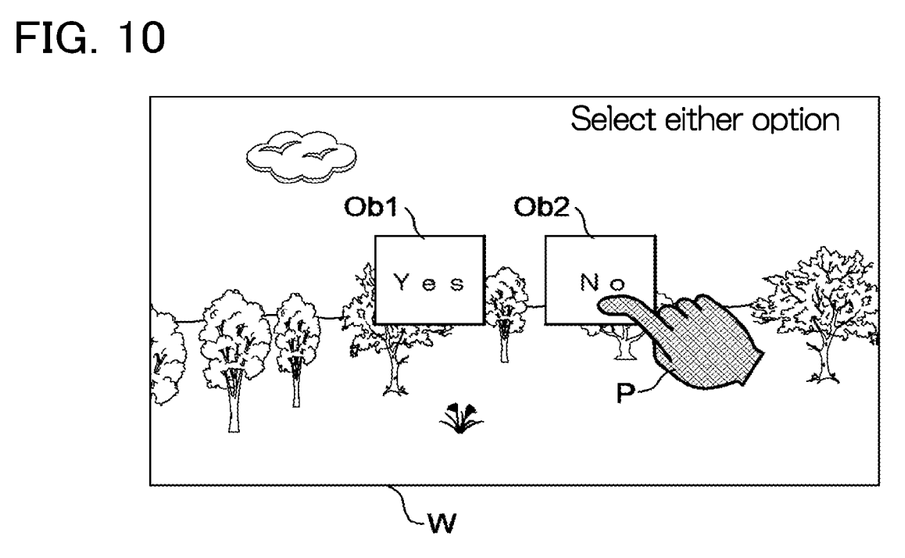
FIG. 10 is a diagram showing an example screen displayed by the display device.
Figure 11:
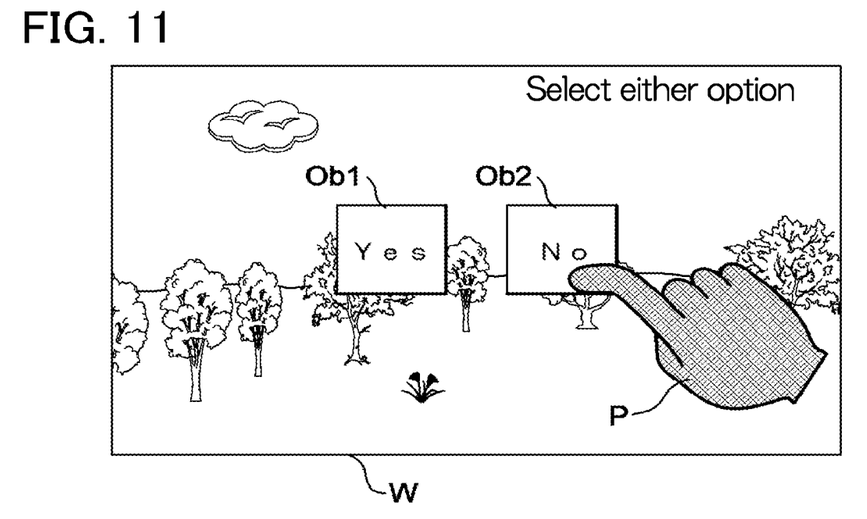
FIG. 11 is a diagram showing an example screen displayed by the display device.
Figure 12:
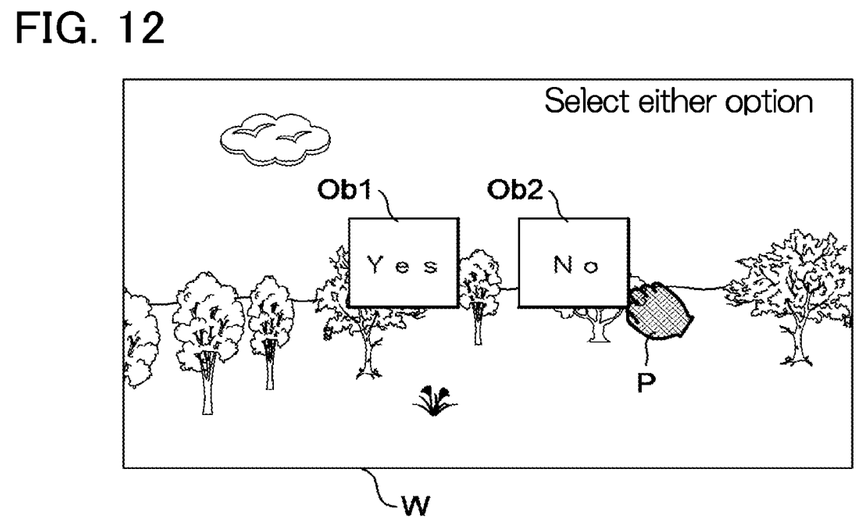
FIG. 12 is a diagram showing an example screen displayed by the display device.

Each of FIG. 10, FIG. 11, and FIG. 12 illustrates an example of an object to be manipulated displayed in the virtual space. As shown in these figures, objects to be manipulated Ob1 and Ob2 are displayed in the virtual space. The object to be manipulated Ob1 is a software button for making the user 3 select an affirmative answer to the question in replying to a question, and the object to be manipulated Ob2 is a software button for making the user 3 select a negative answer to the question.

If it is determined that no object to be manipulated is displayed in the virtual space (if the result of the determination in step S20 is "No"), the operation controller 150 returns the processing procedure again to step S20. That is, the operation controller 150 repeats step S20 until an object to be manipulated is displayed in the virtual space after the initial condition is satisfied (i.e., the controller enters a standby state).

On the other hand, if it is determined that an object to be manipulated is displayed in the virtual space (if the result of the determination in step S20 is "Yes"), the operation controller 150 reads the reference size information relating to the size of the pointer P and the reference distance stored in the storage device 104, to supply the reference size information and the reference distance to the second determiner 158. The second determiner 158 determines whether a manipulation was carried out such as the user touched the object to be manipulated, based on the position in the XY plane (two-dimensional coordinates) of the pointer P displayed at a current time in the virtual space and the position in the coordinates in the Z-axis, which is depth, of the pointer P displayed at a current time in the virtual space (step S21).

First, the second determiner 158 determines the position in the X-Y plane of the pointer P displayed in the virtual space, as follows. That is, the second determiner 158 determines that the pointer P is within the frame of the object to be manipulated in the X-Y plane when the index finger of the pointer P is located within the square frame of the object to be manipulated. In the present embodiment, since the object to be manipulated is displayed in the virtual space provided in stereoscopic view, even if it is determined that the pointer P is within the frame of the object to be manipulated in the X-Y plane, it may not match depthwise, i.e., in the Z-axis direction, of the object to be manipulated. Therefore, the second determiner 158 determines the depthwise Z-axis position of the pointer P displayed in the virtual space as follows.

The second determiner 158 compares the size of the pointer P displayed in the virtual space at a current time with the size of the pointer P indicated by the reference size information read from the storage device 104, and determines whether the difference in size is within a predetermined range. Specifically, the second determiner 158 compares the size of the pointer P displayed in the virtual space with the size of the pointer P indicated by the reference size information, and if the difference between the former and the latter is within a predetermined range, the second determiner 158 determines that the pointer P displayed in the virtual space is within a certain range from a point that is at a reference distance in the Z-axis direction as viewed from the user 3. If the difference in size is greater than the upper limit of the predetermined range, the second determiner 158 determines that the pointer P displayed in the virtual space is at a point closer than the certain range from the point at the reference distance as viewed from the user 3, and if the difference in size is less than the lower limit of the predetermined range, then the second determiner 158 determines that the pointer P displayed in the virtual space is at a point farther away than the certain range from the point at the reference distance as viewed from the user 3.

Accordingly, the second determiner 158 determines that the pointer P is touching the object to be manipulated if the pointer P is within the frame of the object to be manipulated in the X-Y plane and if the pointer P displayed in the virtual space is within a certain range of the point at the reference distance as viewed from the user 3. When it is determined by the second determiner 158 that the pointer P is touching the object to be manipulated, the operation controller 150 may invert the color of the object to show the user 3 that the user 3 is touching the object, change the color of the object to be manipulated, or vibrate the HMD 1.

Figure 13:
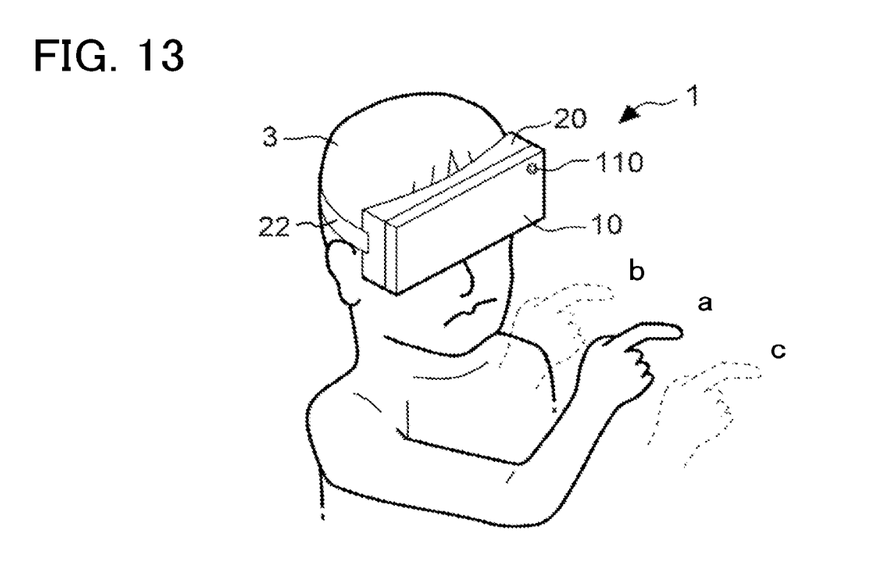
FIG. 13 is a diagram showing an example manipulation performed by a user.

A description will be given of a case in which the user 3, who is wearing the goggles 20, points the right index finger at a point "a" in the imaging area of the image capture device 110, as shown in FIG. 13, to touch the object to be manipulated Ob2 in FIG. 10. In this case, since the distance from the user 3 (strictly speaking, the image capture device 110) to the right index finger is approximately the same as the distance therefrom to the right index finger at the time the initial condition is satisfied, the difference between the size of the pointer P displayed in the virtual space and the size of the pointer P indicated by the reference size information will be within the predetermined range. Therefore, in this case, the second determiner 158 determines that the pointer P has touched the object to be manipulated Ob2.

Furthermore, a description will be given of a case in which the user 3, who is wearing the goggles 20, points the right index finger at a point "b" in the imaging area of the image capture device 110, as shown in FIG. 13. In this case, as shown in FIG. 11, the distance from the user 3 to the right index finger is closer than the distance therefrom to the right index finger at the time the initial condition is satisfied. Accordingly, where the size of the pointer P displayed in the virtual space is Sb and the size of the pointer P indicated by the reference size information is Sm, the more the pointer is out of a predetermined range (Sb>Sm), the greater the difference of Sb is relative to Sm (Sb−Sm). Therefore, in this case, the second determiner 158 does not determine that the pointer P has touched the object to be manipulated Ob2 since, even if the pointer P is within the frame of the object to be manipulated Ob2 in the X-Y plane, the pointer P displayed in the virtual space is at a point closer than the point at the reference distance as viewed from the user 3.

Furthermore, a case is assumed in which the user 3, who is wearing the goggles 20, points the right index finger at point "c" in the imaging area of the image capture device 110 as shown in FIG. 13. In this case, as shown in FIG. 12, the distance from the user 3 to the user's right hand is farther than the distance to the user's right hand at the time the initial condition was satisfied. Therefore, when the size of the pointer P displayed in the virtual space is Sc, the more the pointer is outside the predetermined range (Sc<Sm), the smaller the difference (Sc−Sm) of Sc relative to the size Sm of the pointer P indicated by the reference size information. Therefore, in this case, the second determiner 158 does not determine that the pointer P has touched the object to be manipulated since, even if the pointer P is within the frame of the object to be manipulated in the X-Y plane, the pointer P displayed in the virtual space is at a point farther than the point at the reference distance as viewed from the user 3. When the pointer P displayed in the virtual space is at a point farther than the reference distance as viewed from the user 3, the pointer P may be displayed with the pointer P hidden on the back side of the object to be manipulated at the reference distance, as shown in FIG. 12.

In the example of the present embodiment, an object to be manipulated is displayed as if the object to be manipulated were at a point away from the user 3 by a reference distance. However, the object to be manipulated need not necessarily be displayed at a point at the reference distance. For example, when the object to be manipulated is displayed at a point closer than the point at the reference distance, the size of the pointer P associated with the reference distance may be processed to make a larger size for use in performing the depthwise determination of the object to be manipulated. When the object to be manipulated is displayed at a point farther than the point at the reference distance, the size of the pointer P associated with the reference distance may be processed to make a smaller size for use in performing the depthwise determination of the object to be manipulated.

If it is determined that the pointer P is not touching the object to be manipulated when the object to be manipulated is displayed (when the determination result of step S21 is "No"), the operation controller 150 returns the processing procedure again to step S21. That is, the operation controller 150 repeats step S21 until it is determined that the pointer P has touched the object to be manipulated.

On the other hand, if it is determined that the pointer P has touched the object to be manipulated (if the result of the determination in step S21 is "Yes"), the second determiner 158 determines whether a specific action has been performed by the pointer P (step S22). The specific action is, for example, if the object to be manipulated is a software button, and touch of the object to be manipulated continues for a certain period of time (e.g., one second).

If no specific action is performed (if the result of the determination of step S22 is "No"), the operation controller 150 determines that the touch has been released and returns the processing procedure again to step S21.

On the other hand, if it is determined that a specific action has been performed (if the result of the decision in step S22 is "Yes"), the operation controller 150 reports to an OS and an application program that a command corresponding to the action has been performed (step S23). By this process, if the touching of the object to be manipulated Ob2, as shown in FIG. 10, continues for a certain period of time, the command corresponding to the object to be manipulated Ob2 is executed.

After the processing of step S23, the operation controller 150 returns the processing procedure again to step S10. Since the flowchart shown in FIG. 7 is executed when the pointer P is displayed in the virtual space as described above, the operation of the flowchart ends when the pointer P disappears from the virtual space, with the hand moving outside of the imaging area of the image capture device 110.

According to the terminal apparatus 10 of the present embodiment, the depthwise position of the pointer P displayed in the virtual space as viewed from the user 3 is determined in comparison with the size of the pointer P stored when the initial condition is satisfied, so that the user 3 does not need to wear a dedicated device such as a glove. Therefore, the depthwise position of the pointer P can be determined with a simplified configuration without it being cumbersome to the user.

The depthwise position of an object to be manipulated, displayed in the virtual space, is determined based on the position of the hand placed at a point that is easy for the user 3 to operate at the time the initial condition is satisfied. This enables the user 3 to specify the object to be manipulated within a range in which the user can move a hand easily.

Various Applications and Modifications

Figure 14:
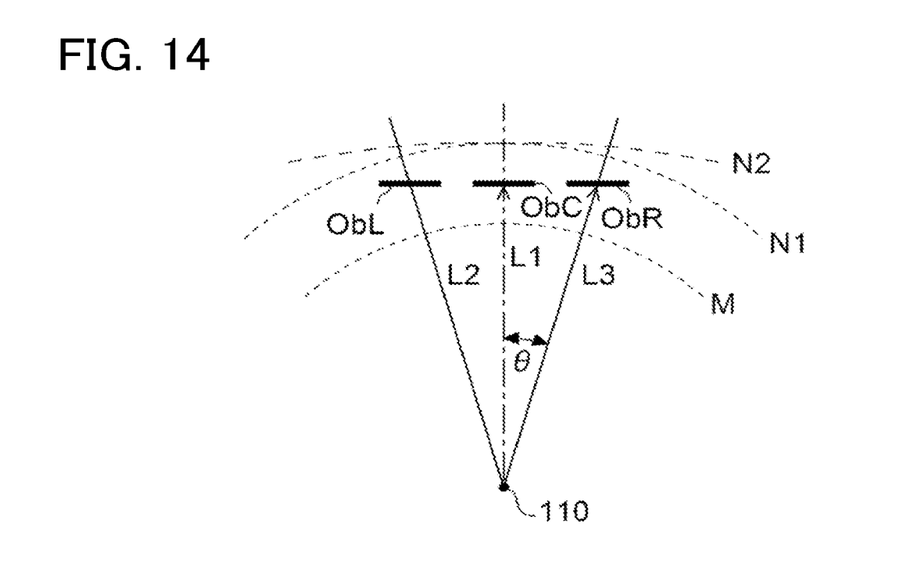
FIG. 14 is a diagram showing an example of a determination when objects to be manipulated are displayed.

FIG. 14 shows a diagram of a case in which three objects to be manipulated ObL, ObC, and ObR are displayed along the X-axis direction. The object to be manipulated ObC is displayed in the front direction L1 (Z-axis direction) as viewed from the user 3; the object to be manipulated ObL is displayed to the left of the object to be manipulated ObC, and the object to be manipulated ObR is displayed to the right of the object to be manipulated ObC, respectively. That is, the objects to be manipulated ObL and ObR are disposed in the space farther than the object to be manipulated ObC as viewed from the user 3. The user 3 draws an arc around the user's own elbow or shoulder as the user moves the user's hand. Therefore, if a certain range in the Z-axis direction (the range from a dashed line M to a dashed line N1 as viewed from the user 3) for determining touching of the object to be manipulated ObC displayed in the front is applied without modification to determine a touching of the object to be manipulated ObL or ObR, the user 3 may feel that it is difficult to manipulate the object to be manipulated ObL or ObR because the distance from the user 3 to the range in which the user is determined to have touched the object to be manipulated ObL or ObR is different from the distance to the range for the object ObC to be manipulated.

Therefore, in a case in which the object to be manipulated ObL is displayed in a direction L2, which is to the left of the direction L1, which is the direction in front of the user, or the object to be manipulated ObR is displayed in a direction L3, which is to the right of the direction L1, the second determiner 158 may change the dashed line N1 to the dashed line N2, such that the range based on which the second determiner 158 determines that each object to be manipulated has been touched makes a second range that is larger than a first range for the object to be manipulated ObC displayed in the front direction of the user.

Specifically, employed as the first range (the range of difference between the size of the pointer P and the size indicated by the reference size information) based on which the second determiner 158 determines that the object to be manipulated ObC displayed in the front direction has been touched, is a range from (i) a difference (Sm−Ss) between the size of the pointer P when the pointer P is located on the dashed line M (Sm) and the size indicated by the reference size information (Ss), to (ii) a difference (Sn1−Ss) between the size of the pointer P when the pointer P is located on the dashed line N1 (Sn1) and the size indicated by the reference size information (Ss) (i.e., a range from (Sm−Ss) to (Sn1−Ss)) (Sn1>Sm>Ss). In contrast, the second range is extended to a larger range than the first range, which is from the difference at dashed line M (Sm−Ss) to the difference at dashed line N1 (Sn1−Ss). Specifically, the second range extends from the difference at dashed line M (Sm−Ss) to the difference at dashed line N2 (Sn2−Ss), which represents a boundary with a broader range than a range with dashed line N1 (i.e., the second range being a range from (Sm−Ss) to (Sn2−Ss)) (Sn2>Sm>Ss). The operability for the user 3 is improved by thus expanding the range in which the conditions for determining whether the object to be manipulated is touched are satisfied.

Preferably, the greater the angle θ from the front direction L1 as viewed by the user 3 (the farther the object to be manipulated ObR (or ObL) is away from the user 3), the greater the range for determining that the object to be manipulated ObR (or ObL) displayed in the right direction L3 (or left direction L2) is being touched.

In the above-described embodiment, when the object to be manipulated is touched for one second as the certain period of time, the object to be manipulated is deemed to be selected, and the command corresponding to the object to be manipulated is executed. However, actions after a touch may be a state other than a state in which the touch continues for one second.

Figure 15:
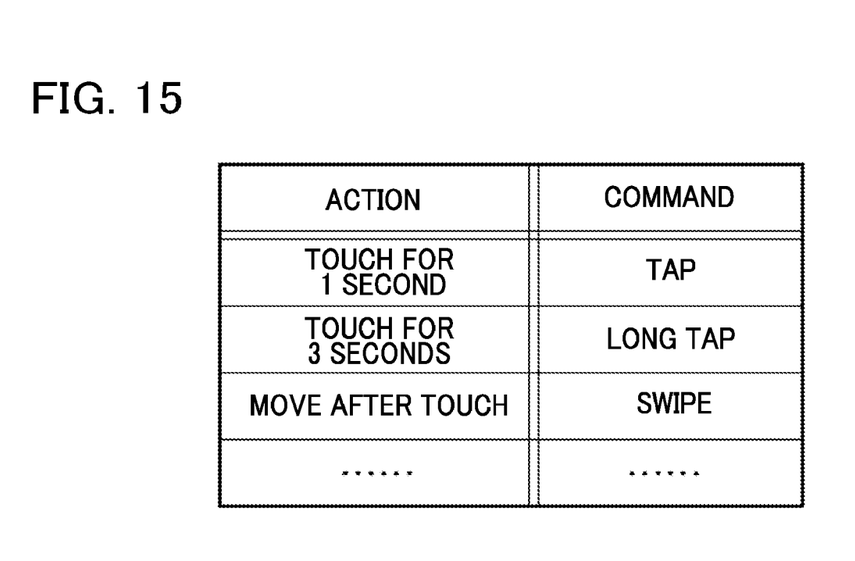
FIG. 15 is a diagram showing an example relationship between a specific action after a touch and content of a command.

FIG. 15 illustrates examples of actions after a touch and is an alternative example of the embodiment. For example, if the touched state lasts for 1 second or more and 3 seconds or less, such a touch may be determined to be a tap, and if the touched state lasts for 3 seconds or more, such a touch may be determined to be a long tap. If the tip S of the index finger moves in either direction after the touch, the fingertip S may be deemed to have swiped in the direction of the movement, and a command corresponding to the swipe may be executed.

Figure 16:
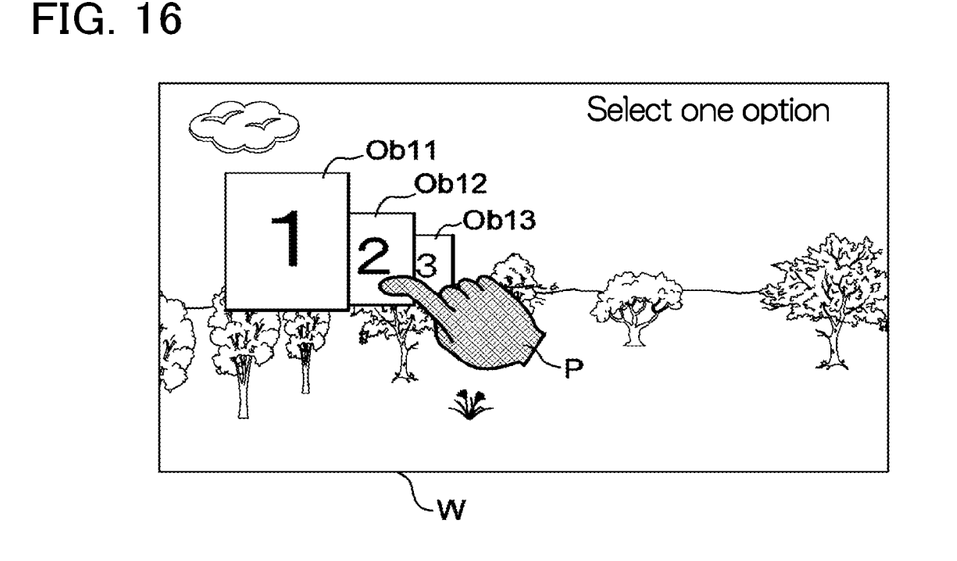
FIG. 16 is a diagram illustrating an example of successive placement of objects to be manipulated in a virtual space in the direction of depth.

A plurality of objects to be manipulated may be displayed consecutively over the depth direction as viewed from the user 3. For example, as shown in FIG. 16, the object to be manipulated Ob1, Ob2, and Ob3 may be successively displayed over the Z-axis direction, which is the depth direction, starting from the front as viewed from the user 3.

In a case in which objects to be manipulated are successively displayed in the depth direction, the size of the pointer P indicated by the reference size information associated with the reference distance may be used as described above, after processing in accordance with the change or difference from the reference distance to the Z-axis distance of each of the objects, to determine whether each object is manipulated as if the pointer P touched the object.

Furthermore, a plurality of thumbnail images of a series of consecutive frames in a video may be displayed successively across the depth direction as viewed from the user 3 as objects to be manipulated, for example. The object to be manipulated (thumbnail image) touched by the pointer P then may be displayed in a separate frame. In this way, for example, when the user 3 moves the pointer P in the Z-axis direction while touching the object to be manipulated, the image displayed in a separate frame will be displayed in a frame feed according to the movement speed of the pointer P.

In the embodiment, description is given of an example of the HMD 1 that provides a virtual space to the user 3. However, the invention can also be applied, for example, to a case in which an image of an object to be manipulated is synthesized with a real space image captured by the image capture device 110 such that the object to be manipulated is displayed in the real space.

APPENDIX

In the illustrated flowchart, the order of steps may be changed. That is, the order of processes in a preferred embodiment of the present invention is not limited to a particular order.

Each of the functions illustrated in FIG. 3 is realized by any combination of hardware and software. Each function may be realized by a single apparatus or by two or more apparatuses configured separately from each other.

A program, whether referred to as software, firmware, middleware, microcode or hardware description language or called by any other name, shall be construed broadly to mean instructions, instruction sets, code, code segments, program code, subprograms, software modules, applications, software applications, software packages, routines, subroutines, objects, executable files, threads of execution, procedures, functions, etc.

The software, instructions, etc., may also be transmitted and received via a transmission medium. For example, when the software is transmitted from a website, server, or other remote sources, by using wired technologies such as coaxial cables, fiber optic cables, twisted-pair cables, and digital subscriber lines (DSL), and/or wireless technologies such as infrared, radio and microwaves, these wired technologies and/or wireless technology are included within the definition of the transmission medium.

The embodiments and modes described herein may be applied to systems that use long term evolution (LTE), LTE-Advanced (LTE-A), SUPER 3G, IMT-Advanced, 4G, 5G, FRA (Future Radio Access), W-CDMA (registered trademark), GSM (registered trademark), CDMA2000, ultra-mobile broadband (UN/B), IEEE 802.11 (Wi-Fi), IEEE 802.16 (WiMAX), IEEE 802.20, ultra-wideband (UWB), Bluetooth (registered trademark), and other appropriate systems and/or next generation systems extended based on these systems.

Input/output information, etc., may be stored in a specific location (e.g., memory) or may be managed by a management table. Input/output information, etc., may be overwritten, updated, or additional information may be appended to the input/output information. The output information, etc., may be deleted. The input information, etc., may be transmitted to other devices.

Decisions may be made in values that can be represented by one bit (0 or 1), may be made in Boolean values (true or false), or may be made by comparing numerical values (e.g., comparison against a predetermined value).

Each of the modes and embodiments described herein may be used alone, in combination, or may be switched as they are performed.

The information and signals and the like described herein may be represented by using any of a variety of different technologies. For example, data, instructions, commands, information, signals, bits, symbols, chips, and the like referred to throughout the above description may be represented by voltages, currents, electromagnetic waves, magnetic fields or magnetic particles, optical fields or photons, or any combination thereof.

The information, etc., described herein may be expressed in absolute values, in relative values with respect to a predetermined value, or in other pieces of applicable information.

A mobile station such as a smartphone is suitable as the terminal apparatus 10, as described above. A mobile station may be referred to by those skilled in the art as a subscriber station, a mobile unit, a subscriber unit, a wireless unit, a remote unit, a mobile device, a wireless device, a wireless communicator, a remote device, a mobile subscriber station, an access terminal, a mobile terminal, a wireless terminal, a remote terminal, a handset, a user agent, a mobile client, a client, or some other suitable terms.

The term "connected" or any modification thereof means any direct or indirect connection or coupling between two or more elements, and may include the presence of one or more intermediate elements between two elements that are "connected" to each other. The coupling or connection between the elements may be physical, logical, or a combination of these. As used herein, it may be considered that two elements are "connected" to each other by using one or more wires, cables and/or printed electrical connections and, to name some non-limiting and non-inclusive examples, by using electromagnetic energy, such as electromagnetic energy having wavelengths in the radio frequency domain, microwave domain, and optical (both visible and invisible) domain.

In the above described embodiment, a recording circuit, such as a ROM and RAM, is given as an example of the storage device 104, but the storage device 104 may be a flexible disk, a magnetic optical disk (e.g., a compact disks, a digital multi-purpose disk, a Blu-ray (registered trademark) disk), a smart card, a flash memory device (e.g., a card, a stick, a key drive), a compact disc-ROM (CD-ROM), a register, a removable disk, a hard disk, a floppy (registered trademark) disk, a magnetic strip, a database, a server, or other suitable storage medium. The program may also be transmitted via a telecommunications line.

In this description, if articles are added by translation, such as "a", "an" and "the" in English, these articles include the plural, unless the context clearly indicates otherwise.

It should be obvious to those skilled in the art that the present invention is not limited to the embodiments described herein. The invention can be implemented as a modified and changed form without departing from the spirit and scope of the present invention defined based on the recitation of the claims. Accordingly, the description herein is for illustrative purposes only and has no restrictive implications for the invention. A plurality of modes selected from the modes illustrated herein may also be combined.

DESCRIPTION OF REFERENCE SIGNS

1 . . . HMD, 10 . . . terminal apparatus, 20 . . . goggles, 102 . . . processor, 150 . . . operation controller, 152 . . . posture detector, 154 . . . operation controller, 156 . . . first determiner, 158 . . . second determiner, P . . . pointer, R . . . reference object, Ob1, Ob2, Ob11-Ob13 . . . object to be manipulated.

The invention claimed is:

1. A terminal apparatus comprising:
an image capture device configured to capture an image of a front view as seen from a user, the front view including a pointer;
one or more memories; and
one or more processors communicatively connected to the one or more memories and configured to execute instructions to:
synthesize an image of the pointer captured by the image capture device with an image of a virtual or real space, to display the synthesized image on a display device;
determine whether the pointer in the space displayed on the display device at a first time point satisfies an initial condition;
store reference size information relating to a size of the pointer in association with a reference distance in the one or more memories, with the size of the pointer being as in a case in which it is determined that the initial condition is satisfied; and
compare a size of the pointer in the space at a second time point after the initial condition is satisfied with the size indicated by the reference size information, to determine whether the pointer is at a position that is closer than a point at the reference distance associated with the reference size information as viewed from the user, or whether it is at a position farther than the point at the reference distance as viewed from the user,
wherein:
the one or more processors are configured to display on the display device an object to be manipulated by the pointer in the space, and
the one or more processors are configured to determine that the pointer has touched the object to be manipulated when part or all of the pointer at the second time point overlaps the object to be manipulated and when a difference between the size of the pointer and the size indicated by the reference size information is within a predetermined range.

2. The terminal apparatus according to claim 1, wherein:
when the determination is performed to determine whether the pointer in the space displayed on the display device at the first time point satisfies the initial condition, the one or more processors are configured to display a reference object at a point at a reference distance from the user, and
the one or more processors are configured to determine that the initial condition is satisfied when the pointer at the first time point is in a predetermined positional relationship relative to the reference object.

3. The terminal apparatus according to claim 2, wherein:
the one or more processors are configured to display a plurality of objects to be manipulated by the pointer in the space at different positions in left and right directions as viewed from the user, and
the one or more processors are configured to:
determine that the pointer has touched a first object to be manipulated when part or all of the pointer at the second time point overlaps with the first object to be manipulated from among the plurality of objects to be manipulated and when a difference between the size of the pointer and the size indicated by the reference size information is within a first range; and
determine that the pointer has touched a second object to be manipulated when part or all of the pointer at the second time point overlaps with the second object to be manipulated from among the plurality of objects to be manipulated, the second object being placed further away from the user in space than the first object to be manipulated, and when a difference between the size of the pointer and the size indicated by the reference size information is within a second range that is greater than the first range.

4. The terminal apparatus according to claim 1, wherein:
the one or more processors are configured to display a plurality of objects to be manipulated by the pointer in the space at different positions in left and right directions as viewed from the user, and
the one or more processors are configured to:
determine that the pointer has touched a first object to be manipulated when part or all of the pointer at the second time point overlaps with the first object to be manipulated from among the plurality of objects to be manipulated and when a difference between the size of the pointer and the size indicated by the reference size information is within a first range; and
determine that the pointer has touched a second object to be manipulated when part or all of the pointer at the second time point overlaps with the second object to be manipulated from among the plurality of objects to be manipulated, the second object being placed further away from the user in space than the first object to be manipulated, and when a difference between the size of the pointer and the size indicated by the reference size information is within a second range that is greater than the first range.

5. The terminal apparatus according to claim 1, wherein the one or more processors are configured to, when the pointer takes a specific action after determining that the pointer at the second time point has touched the object to be manipulated, determine that a command corresponding to the specific action is provided.

6. The terminal apparatus according to claim 1, wherein the pointer is a hand of the user.

7. A method for controlling a terminal apparatus comprising one or more processors, one or more memories, and an image capture device that captures an image of a front view as seen from a user, the front view including a pointer, the method comprising:

synthesizing an image of the pointer captured by the image capture device with an image of a virtual or real space and display the synthesized image on a display device;

determining whether the pointer in the space displayed on the display device at a first time point satisfies an initial condition;

storing reference size information relating to a size of the pointer in association with a reference distance in the one or more memories, with the size of the pointer being as in a case in which it is determined that the initial condition is satisfied; and comparing a size of the pointer in the space at a second time point after the initial condition is satisfied with the size indicated by the reference size information, to determine whether the pointer is at a position that is closer than a point at the reference distance associated with the reference size information as viewed from the user, or is whether it is at a position farther than the point at the reference distance as viewed from the user, wherein:

the method further includes displaying on the display device an object to be manipulated by the pointer in the space, and determining that the pointer has touched the object to be manipulated when part or all of the pointer at the second time point overlaps the object to be manipulated and when a difference between the size of the pointer and the size indicated by the reference size information is within a predetermined range.

* * * * *